June 7, 1932.    S. P. SASHOFF    1,861,453
GASEOUS DISCHARGE DEVICE
Filed July 30, 1930
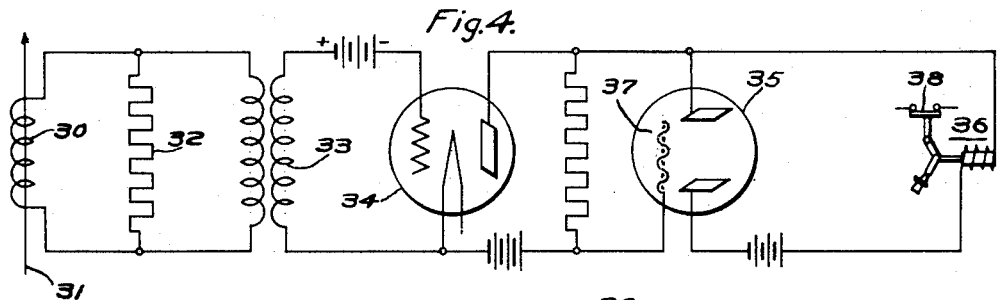
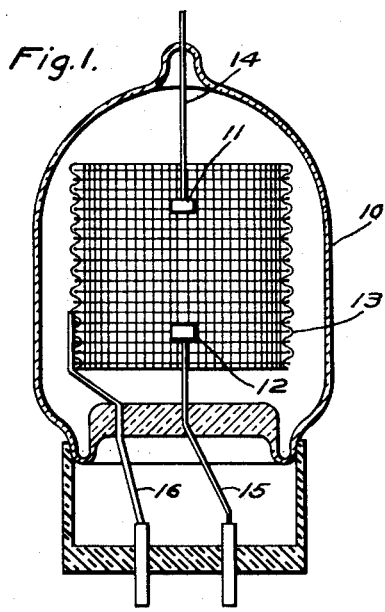
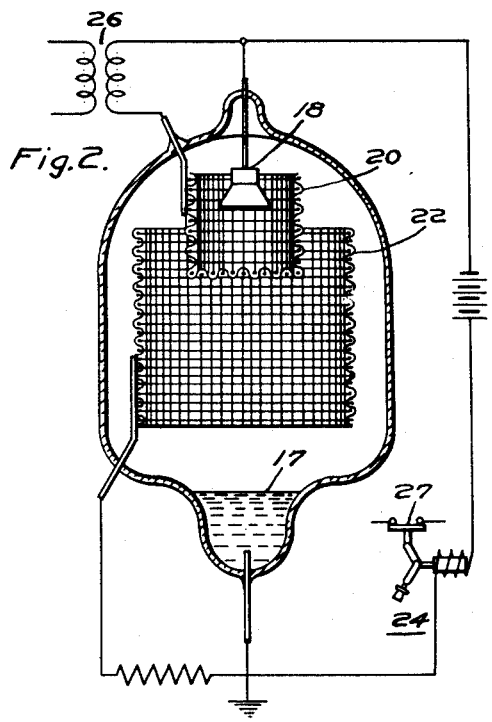
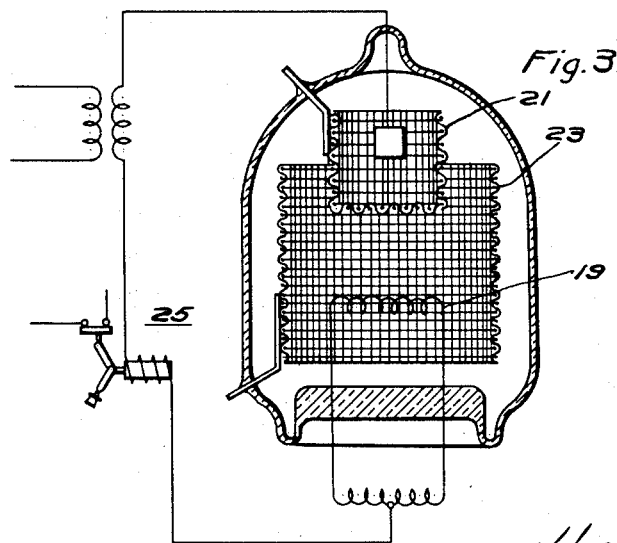
INVENTOR
Stephen P. Sashoff
BY
ATTORNEY Patented June 7, 1932

1,861,453

UNITED STATES PATENT OFFICE

STEPHEN P. SASHOFF, OF SWISSVALE, PENNSYLVANIA, ASSIGNOR TO WESTINGHOUSE ELECTRIC & MANUFACTURING COMPANY, A CORPORATION OF PENNSYLVANIA

GASEOUS DISCHARGE DEVICE

Application filed July 30, 1930. Serial No. 471,608.

This invention relates to a gaseous discharge device and to such devices having a gaseous medium for conduction of the discharge between the electrodes.

An object of my invention is to provide means for controlling the electric field between the electrodes of a gaseous discharge device.

Another object of the invention is to protect the space between the electrodes from outside disturbances.

More specifically, it is an object of my invention to remove inconsistencies in connection with the break-down of a gas-filled discharge device by means of a screen that shall enclose the major portion of the distance between the anode and cathode devices, with the result that the electric field in this region is controlled and protected from outside disturbances.

As a result of the discharge between electrodes inside of a gas-filled tube of the prior art, it has been found that plus or minus charges from the outer lines of force of the field within the two electrodes would gather on the inner walls of the tube and thus form a condenser that would affect the field. This condenser would disturb the field and cause a break-down under different conditions from such as existed prior to the gathering of these charges upon the interior of the walls in the tube.

Inconsistencies in break-down voltage are also found to be due to outside disturbances, such as a nearby oscillator, alternator, radio and like devices.

According to my invention, I provide means for controlling and protecting the major portion of the space between the anode and the cathode of the discharge device that is preferably in the form of a screen to enclose this space and have connections extending to the exterior of the tube.

Other objects of my invention will become evident from the following detailed description, taken in conjunction with the accompanying drawing in which;

Figure 1 is a cross-sectional view disclosing a tube embodying the invention,

Fig. 2 is a cross-sectional view through a modification of the tube of Fig. 1, in conjunction with a diagrammatic view of a part of a system connected to the terminals of the tube, Fig. 3 is a still further modification of the tube and connections disclosed in Figs. 1 and 2, Fig. 4 is a diagrammatic view of a system in which a tube constructed in accordance with the invention is utilized.

The apparatus disclosed in Fig. 1 comprises a tube 10, having two electrodes 11 and 12 therein to act as a cathode and an anode. The interior of the tube is filled with a gaseous conducting medium at a low pressure, such as, argon, neon, helium, or a combination of these, at a pressure of from 1 to 15 millimeters of mercury. If desired, a gas of mercury vapor might be utilized by placing a drop or two of mercury inside of the tube and evaporating it.

A screen 13, preferably in the form of a cylinder, encloses the discharge space between the two electrodes. Connections 14, 15 and 16 extend from the anode, the cathode and the screen to the exterior of the tube. The screen 13 may be maintained at a constant potential to prevent any plus or minus charges from the outer discharge paths from creating a condenser effect by depositing themselves on any insulated surface. The constant potential of the screen controls and stabilizes the electric field between the electrodes and also screens out any outside disturbance. If desired, the screen may also be utilized to act as sort of trigger to start the discharge between the electrodes. In this type of use, the screen would control the electric field between the two electrodes and also protect the field from outside disturbances.

In Fig. 2, the tube is modified and discloses the cathode 17 as a mercury pool. The anode 18 may be in the form of a solid but may have the crater shape illustrated in the drawing. The cathode may be further modified by having the filament shape illustrated by the cathode 19 in Fig. 3.

In Figs. 2 and 3 are disclosed a separate grid 20 or 21, acting as a trigger to start the discharge between the anode and the cathode, while the screen 22 or 23 protects the major portion of the space between the two discharge electrodes against outside disturbances and also prevents the formation of a charge on the interior of the tube created by a gathering there of plus or minus charges. Circuit connections are also disclosed in Figs. 2 and 3 for utilizing the tubes to actuate the circuit breaker 24 or the circuit breaker 25. For example, a disturbance coming over the transformer 26 starts the discharge between the anode 18 and the cathode 17 in Fig. 2, and the current passing therethrough actuates the circuit breaker 24 to break the contact 27.

In Fig. 4 is disclosed another circuit utilizing a tube constructed, according to the invention, as a relay. A current transformer 30 surrounds the portion of the line 31 to detect any frequency or surge for which the tube relay should operate. Suitable resistances 32 and transformers 33 are inserted between the current transformer 30 and a vacuum, or grid-glow tube 34 that acts as a precision device. This vacuum, or grid-glow, tube 34 is used to impress on the tube relay 35, constructed according to the invention, sufficient voltage to break-down the tube 35 when a disturbing effect comes over the line 31. When the tube relay 35 breaks down, the current operates the circuit breaker 36 to break the contact at 38. The combination of the vacuum, or grid-glow, tube 34 with the tube relay 35 acts very much more quickly than a mechanical device, and the provision of the screen 37 in the gaseous discharge device 35, which is similar to the screen 13, 22 or 23, in the other figures of the drawing, maintains, in a consistent state, the break-down characteristic of the tube 35.

It is obvious that changes of form and arrangement of the electrodes and screens disclosed in the drawing may be made without departing from the spirit of the invention. It is, of course, apparent that the cathode may be a solid, a liquid or of filament form, as a matter of choice, and may be selected accordingly.

Although, I have shown and described certain specific embodiments of my invention, I am fully aware that many modifications thereof are possible. My invention, therefore, is not to be restricted except in so far as is necessitated by the prior art and by the spirit of the appended claim.

I claim as my invention:

A gaseous conduction discharge device comprising a container, a gas in said container, an anode, a cathode and a grid in operative relationship in said container and means in said container for controlling the electric field between said electrodes comprising a screen spaced from the walls of said container and enclosing the major portion of the distance between said anode and said cathode.

In testimony whereof, I have hereunto subscribed my name this 23rd day of July, 1930.

STEPHEN P. SASHOFF.